US011813805B2

(12) United States Patent
Karandikar et al.

(10) Patent No.: US 11,813,805 B2
(45) Date of Patent: Nov. 14, 2023

(54) TOOL FOR OPTIMAL PART CONSOLIDATION SELECTION FOR ADDITIVE MANUFACTURING

(71) Applicant: General Electric Company, Schenectady, NY (US)

(72) Inventors: Jaydeep Karandikar, Niskayuna, NY (US); Bathrinarayanan Mukundan, Bengaluru (IN); Arvind Rangarajan, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 925 days.

(21) Appl. No.: 16/425,443

(22) Filed: May 29, 2019

(65) Prior Publication Data

US 2020/0376776 A1 Dec. 3, 2020

(51) Int. Cl.
*B29C 64/10* (2017.01)
*B33Y 30/00* (2015.01)
(Continued)

(52) U.S. Cl.
CPC .......... *B29C 66/87* (2013.01); *B29C 37/0096* (2013.01); *B29C 41/52* (2013.01);
(Continued)

(58) Field of Classification Search
CPC ..... B29C 66/87; B29C 37/0096; B29C 41/52; B29C 66/005; B29C 2037/80;
(Continued)

(56) References Cited

U.S. PATENT DOCUMENTS

| 8,346,791 B1 * | 1/2013 | Shukla | G06F 16/248 |
| | | | 707/759 |
| 8,412,588 B1 * | 4/2013 | Bodell | G06Q 30/0603 |
| | | | 705/26.5 |

(Continued)

FOREIGN PATENT DOCUMENTS

WO 2018127429 A1 7/2018

OTHER PUBLICATIONS

Rodrigue, Hugo "An Assembly-Level Design for Additive Manufacturing Methodology", IDMME—Virtual Concept, vol. 03, France, Oct. 2010, 9pgs.

(Continued)

*Primary Examiner* — Jacob T Minskey
*Assistant Examiner* — Caroline Beha
(74) *Attorney, Agent, or Firm* — HANLEY, FLIGHT & ZIMMERMAN, LLC

(57) ABSTRACT

A method, medium, and system to receive an indication of an assembly including a plurality of different components to produce by additive manufacturing (AM), determine based on a forward search process that starts with individual components of the plurality of components and iteratively adds other components of the plurality of components thereto in combinations until an entirety of the assembly is accounted for, determine based on a reverse search process that starts with the entirety of the assembly and iteratively removes components of the plurality of components therefrom in combinations until a two-component set is reached, automatically select an optimal combination of the plurality of components from the combinations determined by the forward search and reverse search processes; and transmit the selection of the optimal combination of the plurality of components to an AM controller.

20 Claims, 9 Drawing Sheets

(51) Int. Cl.
*B33Y 10/00* (2015.01)
*B29C 65/00* (2006.01)
*B29C 41/52* (2006.01)
*B29C 37/00* (2006.01)

(52) U.S. Cl.
CPC ............ *B29C 64/10* (2017.08); *B29C 66/005* (2013.01); *B29C 2037/80* (2013.01); *B29C 2037/903* (2013.01); *B33Y 10/00* (2014.12); *B33Y 30/00* (2014.12)

(58) Field of Classification Search
CPC . B29C 2037/903; B29C 64/393; B33Y 10/00; B33Y 30/00; B33Y 50/02
See application file for complete search history.

(56) References Cited

U.S. PATENT DOCUMENTS

| | | | |
|---|---|---|---|
| 9,643,251 B2 | 5/2017 | Zalewski | |
| 9,943,996 B2 | 4/2018 | Chen et al. | |
| 2006/0101383 A1* | 5/2006 | Raffo | G06F 8/20 |
| | | | 717/104 |
| 2014/0277669 A1 | 9/2014 | Nardi et al. | |
| 2016/0153796 A1* | 6/2016 | Stankoulov | G01C 21/3469 |
| | | | 701/123 |

OTHER PUBLICATIONS

Zhang, Yicha et al., "Build orientation optimization for multi part production in additive manufacturing", Journal of Intelligent Manufacturing, vol. 28, Issue: 6, Feb. 28, 2015, DOI: 10.1007/s10845-015-1057-1, (pp. 1393-1407, 15 total pages).

* cited by examiner

| # components | # of possible combinations | | |
|---|---|---|---|
| | Fully connected | Least connected (all components connected to one central component only) | Greedy search (forward + reverse) |
| 5 | 31 | 20 | 30 |
| 10 | 1023 | 530 | 110 |
| 15 | 32767 | 16412 | 240 |
| 20 | 1048575 | 524326 | 420 |
| 25 | 33554431 | 16777264 | 650 |

TOOL FOR OPTIMAL PART CONSOLIDATION SELECTION FOR ADDITIVE MANUFACTURING

BACKGROUND

The field of the present disclosure relates generally to additive manufacturing, and more particularly, to an additive manufacturing tool to determine optimal set(s) of components for consolidations in an assembly.

Advances in additive manufacturing (AM), as well as advances in electronic communications, computer imaging, and other engineering aspects that may be leveraged by AM, continue to be realized such that the use and application of AM continues to expand. While the different uses and applications of AM continues to grow, the costs associated with AM is often a major concern regarding whether AM is practical for many applications or use-cases. For example, the costs associated with producing an assembly via AM might be prohibitively high compared to a traditional production process (e.g., cast and mold, mechanical fasteners, etc.) for a (limited) production run of the given assembly.

In some respects, a need exists for methods and systems that provide an efficient and accurate mechanism for selecting optimal set(s) of components comprising an AM assembly.

DETAILED DESCRIPTION

Embodying systems and methods herein relate to Additive Manufacturing (AM) systems that, in general, produce a three-dimensional (3D) object or assembly by joining materials under computer control. AM may successively add materials, for example in layers, to create the three-dimensional assembly or object based on 3D model data. In general, an assembly is a collection of multiple different parts or components that are joined together. In some instances, AM provides a mechanism to manufacture or print multiple components as a single component (i.e., a full assembly) or multiple sub-assemblies.

As an example, to illustrate some of the advantages of AM, an assembly that might traditionally be comprised of 100 component parts might be produced as 10 components using AM. In another example, an assembly traditionally comprising three components that are bolted together might be produced by AM as a single unit assembly. The AM process might therefore realize cost reductions with respect to, for example, manufacturing costs, assembly time, supply chain complexities, and/or other cost factors.

Figures 1, 2:
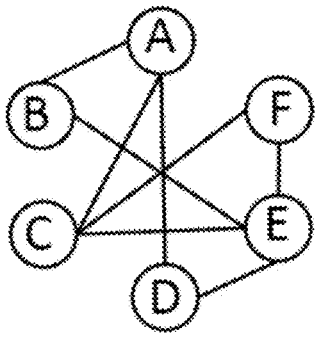
FIG. 1 is an illustrative connection graph of an example assembly, in accordance with some embodiments.
FIG. 2 is an illustrative tabular example listing the number of possible combinations for an assembly including different number of components, in accordance with some embodiments.

In some aspects, some successful applications of additive manufacturing to product design is a result of consolidation of several components in an assembly. This may be due to an improved performance of the consolidated product coupled with reduced manufacturing costs and a simplified supply chain. Determining the consolidation of parts for an AM product or assembly was traditionally a manual process. FIG. 1 is an illustrative connection graph showing the different possible interconnections between six components labeled A, B, C, D, E, and F. However, such determinations are not humanly practical and/or practicable when the number of components in an assembly number more than a few. This is the case since the number of possible sets for consolidation increases exponentially with the number of components in an assembly.

In a fully-connected assembly having n components, there are $2^n-1$ possible sets. Referring to FIG. 2 and table 200 listed therein, it is seen that for a 25-component assembly, there are 33,554,431 possible combinations/sets of the components for the fully-connected assembly (FIG. 2, column 205). In an assembly of 25 components where all components are connected to one principal component only (FIG. 2, column 210—"least connected") there are 16,777,264 possible sets. As a result, it is computationally infeasible to do a brute-force evaluation and calculate the optimization objective for all possible sets. Even with ten different components, the possible number of combinations varies from 1023 and 530 for the fully-connected and least connected assemblies, respectively. As such, there is a problem of selecting the optimal set of components to be used in AM. It is not feasible or practical to address this problem using a trial-and-error method, human judgement, or experience.

The present disclosure technically addresses and solves the problem of how to efficiently select the number of parts or components for consolidation for AM using a novel greedy search algorithm or process that determines the set(s) of optimal part components for consolidation. In some aspects, the process (e.g., algorithm) may be integrated in a design tool. The design tool may, at a high level, provide a mechanism (e.g., user interface, UI) for a user to select an entire assembly or select specific components thereof (e.g., a sub-assembly) to search for an optimal set of components to consolidate. In some aspects, the design tool might provide a mechanism that facilitates a user selection of the material, type of additive process, type of AM machine, fabrication site, the annual volume for the assembly, and other related AM costs.

Referring to FIG. 2, column 215, a listing of the possible combinations of components that are considered using aspects of a process disclosed herein is shown. The process, a "greedy search" process will be discussed in greater detail below. For now, it is seen that the number of possible combinations to be considered is reduced to 650 for an assembly having 25 different components. This is a significant reduction from the number of possible combinations listed in columns 205 and 210.

Figure 3:
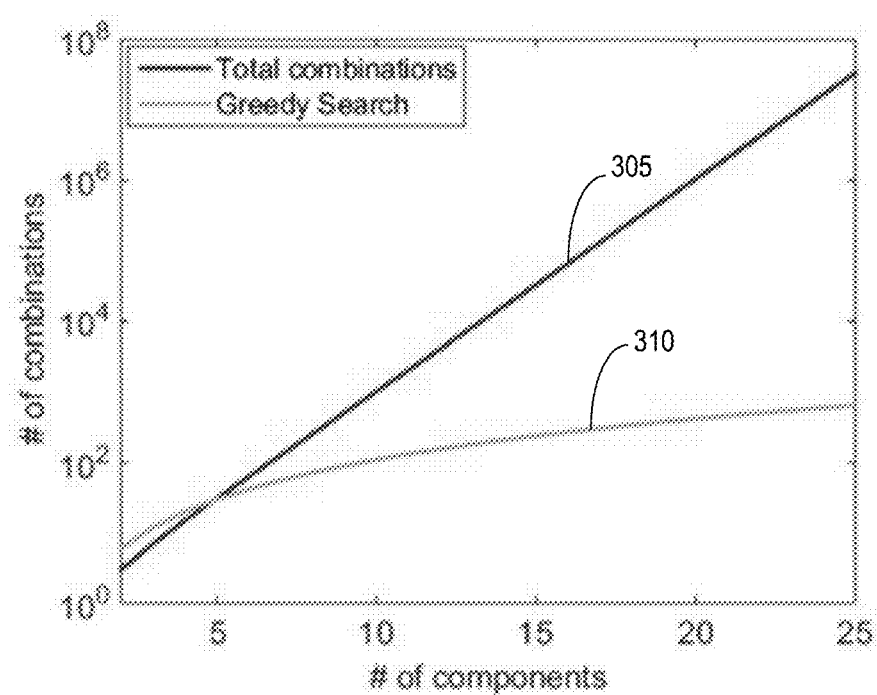
FIG. 3 is an illustrative graph depicting the number of combinations of components, in accordance with some embodiments.

FIG. 3 is an illustrative graph 300 with plots depicting the total number of combinations (y-axis) for a given number of components in a fully-connected assembly (x-axis). As shown by line 305, the total number of combinations increases exponentially with increases in the number of components as discussed above, while the number of combinations is significantly reduced for the corresponding number of components using the "greedy search" process disclosed herein and illustrated by line 310.

In some aspects, the present disclosure relates to an intelligent process to determine an optimal number (i.e., set) of combinations for consolidation. It is noted that some previous systems and processes might have performed an analysis after a determination or decision was made to consolidate a number of components (e.g., five) into a single analysis. The analysis was typically performed to determine, for example, what the distortions would be, what the support structure should be, whether the assembly was actually possible to print the assembly given the stresses and/or other physical/mechanical perspectives. etc. In this example illustrating some prior systems and methods, the analysis was performed post-processing, after a decision had already been made to consolidate five components.

The present disclosure relates to and includes an initial determination to identify what are the different possible, feasible combinations (i.e., sets) that will yield the lowest costs (or some other parameter/constraint) if a target assembly were additively manufactured. In some aspects, the technical solution disclosed herein starts with the a target assembly and solves, using a novel process disclosed herein, the problem of selecting different components that are candidates (e.g., feasible) for consolidation. From one perspective, the present disclosure determines the components of a target assembly (e.g., full assembly or a sub-assembly) that minimizes additive manufacturing costs. This determined set of consolidated parts is referred to herein, in some instances, as an optimal combination or set of the components for the assembly.

Figure 4:
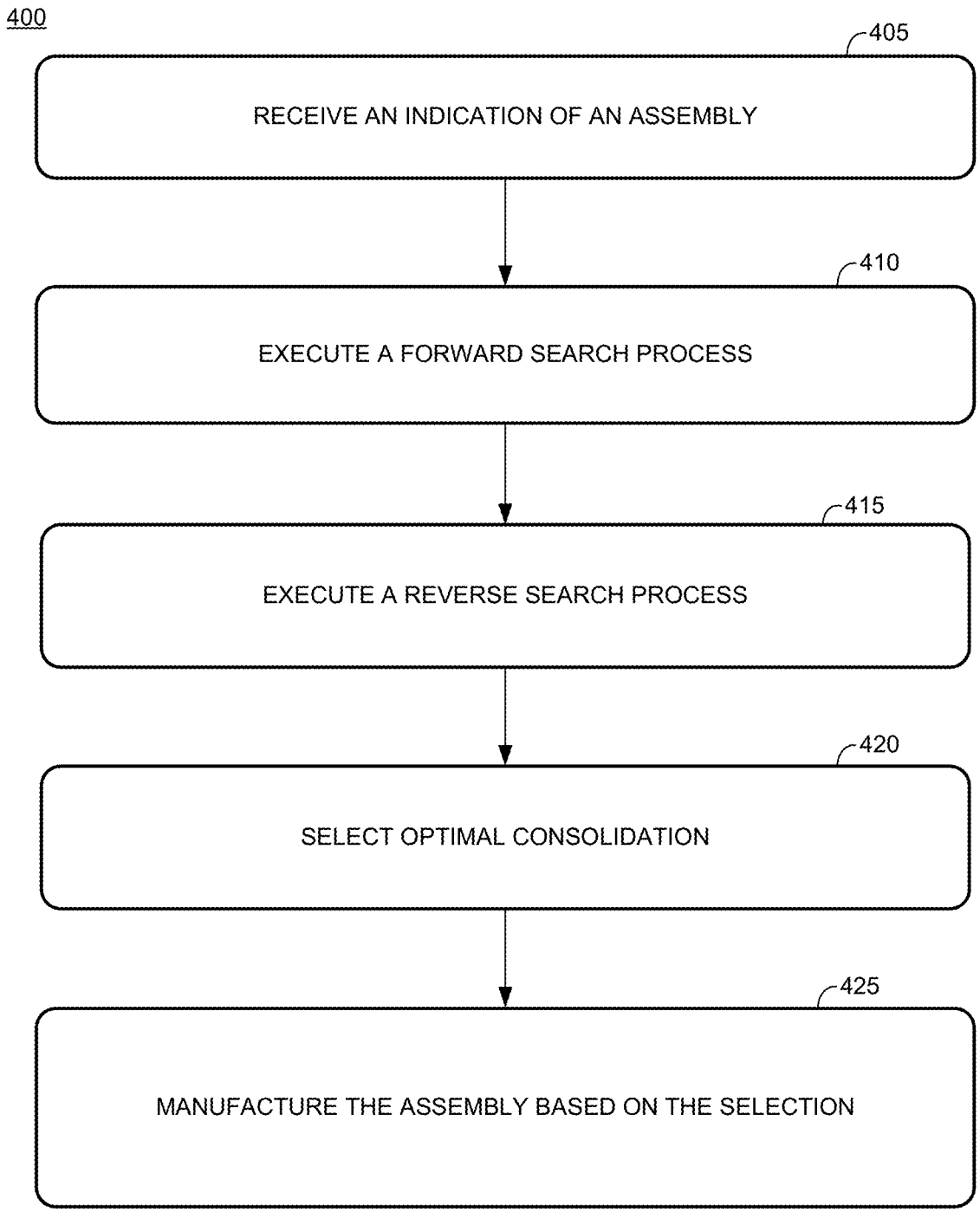
FIG. 4 illustrates a flow diagram for an example process, in accordance with some embodiments.

FIG. 4 is an illustrative flow diagram of an example process 400, in accordance with some embodiments. In particular, process 400 relates to a greedy search process to determine an optimal set of components or parts for consolidation regarding an AM assembly. In some aspects, the optimal set might include far fewer combinations than an original problem including a given number of parts. For example, referring to the table in FIG. 1, the optimal set for 25 parts may include evaluating 325 combinations, as opposed to 33,554,431 and 16,777,264 for a fully-connected assembly and least connected assembly. In some aspects, an initial determination of the optimal set including 325 combinations for inclusion in an AM process provides improvements, including but not limited to, increased manufacturing efficiencies, cost reductions, time reductions, etc. For example, the computational time and resources to consider and process 325 combinations may typically be much less than the computational resources (e.g., processing time, storage requirements, etc.) to processing 33,554,431 and 16,777,264 combinations.

Process 400, at operation 405, receives an indication of an assembly to produce by AM. The assembly will include at least two different components. A user (e.g., an AM engineer or other personnel) might provide the indication of the assembly to be manufactured by the AM process. In some embodiments, the user might select or otherwise indicate the assembly to be manufactured by an AM system by selecting, via an outward facing UI of a design tool (e.g., application, app, system, service, or combinations thereof). The selection process might include highlighting, clicking, or any other suitable method of registering a user's selection by a computing device, by any method (now known or developed in the future) of user input and interaction. In some instances, the indication of the assembly might correspond to a full extend of an object (i.e., a full assembly) or a portion thereof (i.e., a sub-assembly).

The design tool executing process 400 may create two lists (or some other data structure). A first list might include all component pairs that are in contact (or connected) and a second list might include all of the individual components with their corresponding volumes and bounding box dimensions in three-dimensional space (e.g., X, Y, Z, where the units can be metric, English, or some other standard). The first list may be used to create a graph of components (e.g., a connection graph, a connectivity matrix, or some other representation supported by a data structure) that shows the different connections between the component pairs. The individual component data of the first list may be used along with manufacturing site, selected AM machine, manufacturing material, and the annual (or other relevant timeframe) volume information to calculate the optimization cost (or other objective) for manufacturing each component using the selected additive process. These and/or other AM-related cost (or other objective) factors may be used instead of and/or in addition to those specifically listed here. The two lists (or other relevant data structure) may be provided as inputs to a greedy search process. The greedy search process may include two parts—operations 410 and 415, where operation 410 includes a forward search process and operation 415 includes a reverse search process. In some aspects the forward search process 410 is executed and then subsequently followed by the reverse search process 415.

At operation 410, a forward search process is executed or performed. Operation 410 may start with individual components of the plurality of components of the assembly indicated in operation 405. Operation 405 may initially select the individual component with the best optimization (e.g., lowest cost per unit or cost/unit volume (cubic centimeter, cubic inches, or other units of measure)) for additive manufacturing, and at a next or successive step, determines all connections of the selected component and adds the component to the set that minimizes the optimization objective (i.e., having the lowest associated cost). The forward search process of operation 410 may repeat until no additional components of the plurality of components remain to be added (i.e., until an entirety of the assembly or the user-selected sub-assembly is accounted for).

Proceeding to operation 415, a reverse search process is executed or performed. Operation 415 may start with the (full) assembly indicated at operation 405 and the ending point of operation 410. Operation 410 may initially eliminate a component from the (full) assembly and calculate a cost associated with each of the resulting combinations, where the combination is possible/connected. Operation 410 may select the individual component with the best optimization (e.g., lowest cost per unit or cost/unit volume (cubic centimeter, cubic inches, or other units of measure)) for additive manufacturing, and at each successive step, iteratively remove the selected component from the set that minimizes the optimization objective. The reverse search process of operation 415 may repeat until the assembly includes two-components.

At operation 420, selecting, by the processor, an optimal combination of the plurality of components determined from all the combinations evaluated in the forward search process of operation 410 and the reverse search process of operation 415 is automatically selected. In some embodiments, the selected, optimal combination will be the combination of components determined to minimize the objective (e.g., have the lowest cost). In the present example, the optimal part consolidation is the combination of components specified in FIG. 5A at 530, which has the lowest cost of any of the evaluated combinations (i.e., 7.0).

Process 400 proceeds to operation 425 where the selected optimal combination is sent to the selected AM system for manufacture of the assembly based on the combination of components specified in the optimal selection.

Figure 5A:
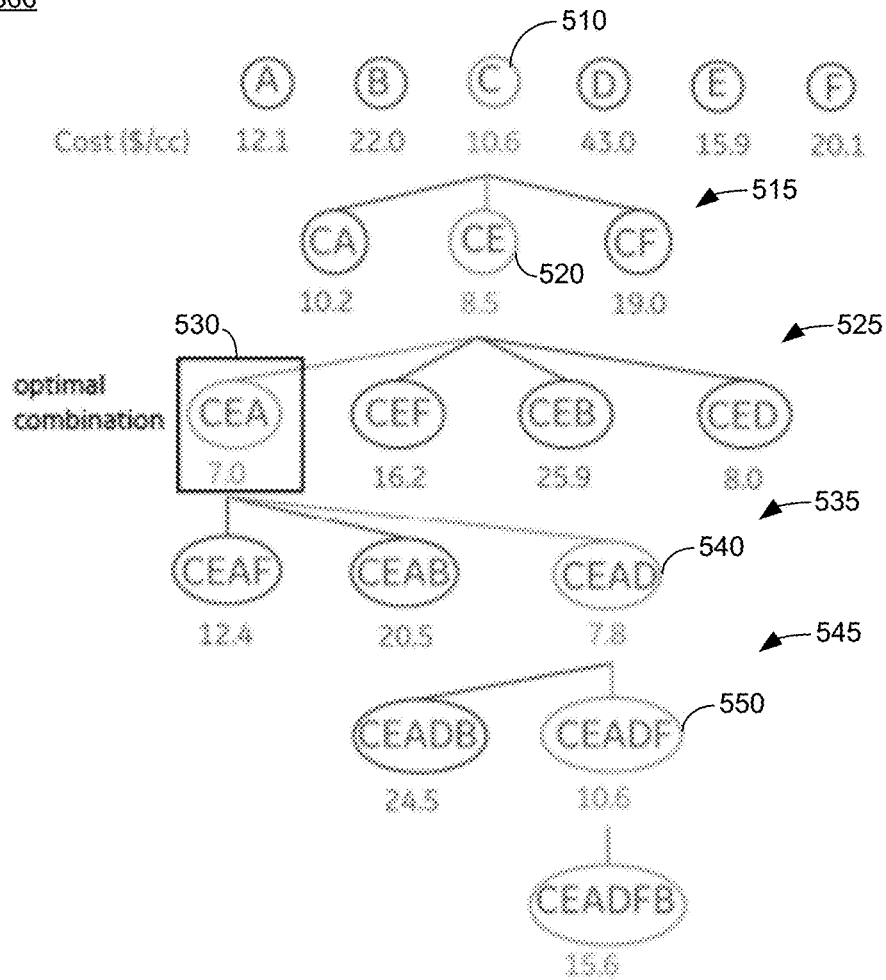
FIG. 5A illustrates an example forward search process, in accordance with some embodiments.
Figure 5B:
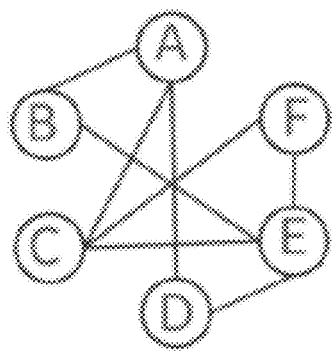
FIG. 5B is an illustrative connection graph corresponding to FIG. 5A.

FIG. 5A illustrates an example forward search process 500, in accordance with some embodiments. The individual components are shown at 505, where each component is shown with its associated cost (e.g., A=12. 1, B=22.0, etc.). As seen, component C has the lowest individual component cost of 10.6. Therefore, component C is selected and other components defined to be connected thereto, as illustrated in the connection graph in FIG. 5B, are added to component C as shown at 515. This process repeats to obtain the combinations shown at levels 525, 535, 545, and 560, where the combination of components at 560 is the complete assembly. As shown, the lowest cost combination at each step or level (i.e., 510, 520, 530, 540, 550, and 560) has a connected component (as specified in the connection graph in FIG. 5B) added thereto to obtain a next set of combinations of components until the full assembly is reached at 560, wherein no more or additional components are available to add.

Figure 6A:
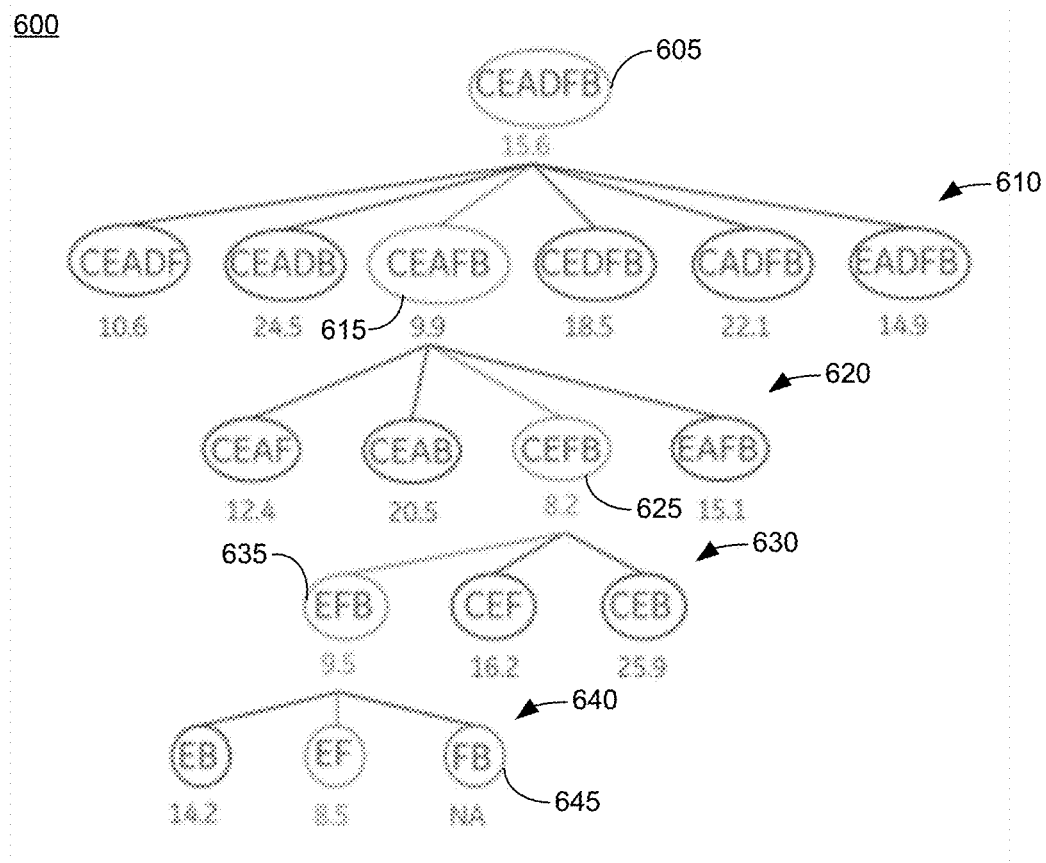
FIG. 6A illustrates an example reverse search process, in accordance with some embodiments.
Figure 6B:
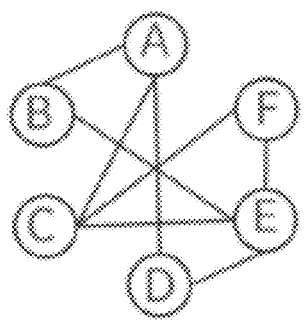
FIG. 6B is an illustrative connection graph corresponding to FIG. 6B.
Figure 7:
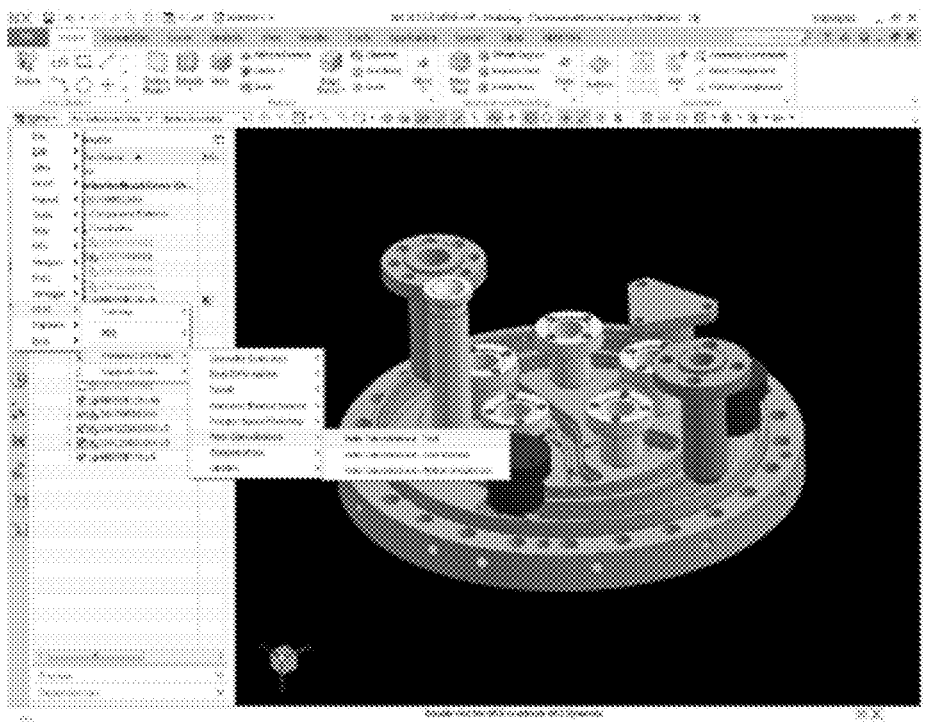
FIGS. 7-10 are each illustrative aspects of a user interface for a design tool, in accordance with some embodiments.

FIG. 6A illustrates an example reverse search process, in accordance with some embodiments. FIG. 6A illustrates an example reverse search process 600, in accordance with some embodiments. The (full) assembly is shown at 605, where the (full) assembly includes the combination of components ultimately reached as an ending point in the forward search process of FIG. 5A. The cost associated with the (full) assembly was previously calculated/determined (e.g., during the forward search process) as 15.6 and need not be re-calculated again (e.g., it may be retrieved from a memory storage location). A component is removed from the (full) assembly 605 and the resulting feasible combinations are determined, as illustrated at step/level 610. It is noted that combinations not possible as specified by the connection graph of FIG. 6B are not considered. This process repeats to obtain the combinations shown at levels 620, 630, and 640, where the combinations of components at 640 include two-components. As shown, the lowest cost combination at each step or level (i.e., 615, 625, and 635) has a connected component (as specified in the connection graph in FIG. 5B) removed therefrom to obtain a next set of combinations of components until the set of two-components is reached at 640.

In some aspects, efficiency is improved by not (re-)calculating optimization objective(s) (e.g., cost) associated with combination of components that were previously calculated during the previous forward search process. Also, the cost for combinations that are not possible are not calculated. As shown in FIG. 6B, the combination of "FB", 645, is not possible. Accordingly, its cost is not calculated at step/level 640.

Figure 8:
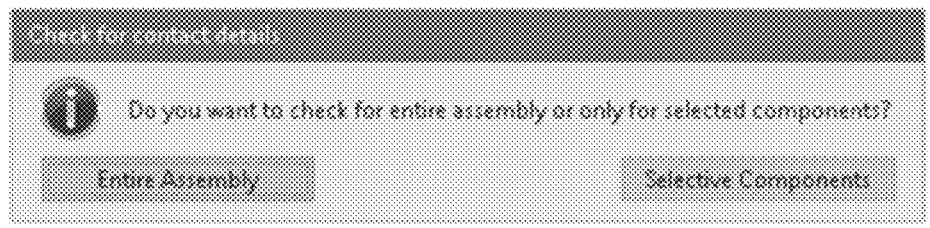
Figure 9:
Figure 10:
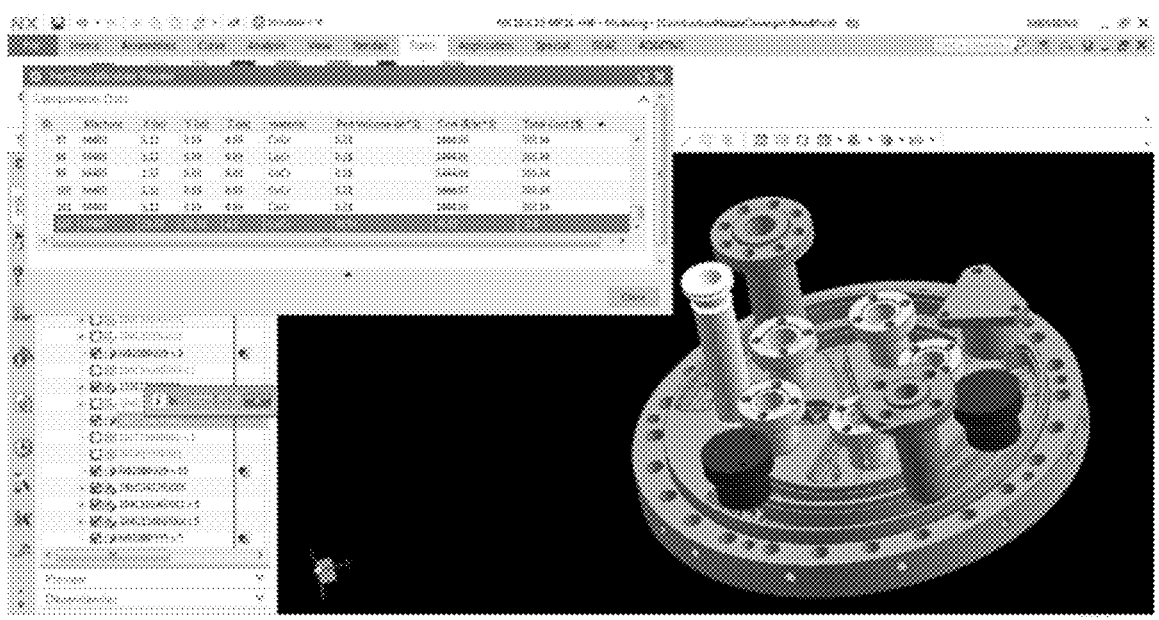

FIGS. 7-10 are each illustrative aspects of a user interface for a design tool, in accordance with some embodiments. In some embodiments, FIG. 7 includes an outward facing UI that includes a depiction of an assembly 705 that may be selected by a user interacting with the UI of a design tool. As depicted in FIG. 8, the user may be solicited to indicate whether the full assembly or selected components thereof are to be considered in the part consolidation process herein. The design tool may request further user inputs regarding the current instance of the consolidation process, including for example, values and/or specific selections regarding individual components and/or the AM process (e.g., AM machine and material parameter values), as depicted in FIG. 9. FIG. 10 illustrates, in part, some of the calculations determined by the design tool based on, for example, the bounding box details (X, Y, Z) for an assembly and part volume. The UI may further include for example, a display of the individual component location (X, Y, Z), part material, part volume, the cost per part unit, and total combination cost.

Figure 11:
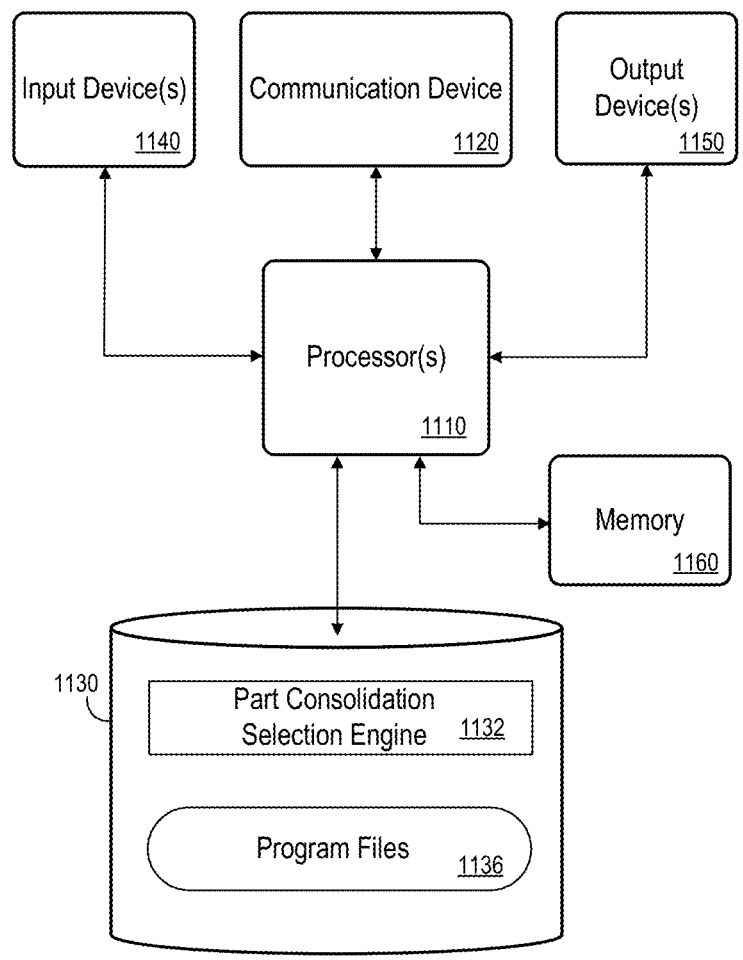
FIG. 11 illustrates a schematic diagram of a system, in accordance with some embodiments.

FIG. 11 is a block diagram of computing system 1100 according to some embodiments. System 1100 may comprise a general-purpose or special-purpose computing apparatus and may execute program code to perform any of the methods, operations, and functions described herein. System 1100 may comprise an implementation of one or more systems (e.g., a design tool, an AM system or parts thereof, etc.) and processes (e.g., 400). System 1100 may include other elements that are not shown, according to some embodiments.

System 1100 includes processor(s) 1110 operatively coupled to communication device 1120, data storage device 1130, one or more input devices 1140, one or more output devices 1150, and memory 1160. Communication device 1120 may facilitate communication with external devices, such as a data server and other data sources. Input device(s) 1140 may comprise, for example, a keyboard, a keypad, a mouse or other pointing device, a microphone, knob or a switch, an infra-red (IR) port, a docking station, and/or a touch screen. Input device(s) 1140 may be used, for example, to enter information into system 1100. Output device(s) 1150 may comprise, for example, a display (e.g., a display screen) a speaker, and/or a printer.

Data storage device 1130 may comprise any appropriate persistent storage device, including combinations of magnetic storage devices (e.g., magnetic tape, hard disk drives and flash memory), optical storage devices, Read Only Memory (ROM) devices, etc., while memory 1160 may comprise Random Access Memory (RAM), Storage Class Memory (SCM) or any other fast-access memory.

Part consolidation selection engine 1132 may comprise program code executed by processor(s) 1110 (and within the execution engine) to cause system 1100 to perform any one or more of the processes (e.g., 400) described herein. Embodiments are not limited to execution by a single apparatus. Data storage device 1130 may also store data and other program code 1136 for providing additional functionality and/or which are necessary for operation of system 1100, such as device drivers, operating system files, etc. In some embodiments, one or more of the processes disclosed herein or portions thereof may be automatically executed on a record, file, listing, data stream, or other data structure to determine optimal set(s) of components for consolidations in one or more assemblies. In some embodiments, the record, file, listing, data stream, or other data structure may be stored, persisted, or be sourced from an instance of a database or other data storage facility, which might be associated with a product, a service, and an application (e.g., a project lifecycle management (PLM) system).

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods disclosed herein, such as a method of determining a selection of an optimal part consolidation using a greedy search process (i.e., process 400, FIG. 4).

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

What is claimed is:

1. A method comprising:
  receiving, by a processor, an indication of an assembly to produce by a first additive manufacturing (AM) machine, the assembly including a plurality of components, each component of the plurality of components represented by a respective part file;
  generating, by the processor, a first data structure and a second data structure based on the part files and the first AM machine, the first data structure to include pairs of components of the plurality of components that are in contact, the second data structure to include volumes of individual components of the plurality of components, the first data structure and second data structure to be inputs to a forward search process and a reverse search process;
  executing, by the processor, the forward search process to reduce an amount of possible combinations of the plurality of components to evaluate for consolidation using a plurality of constraints including i) the respective volumes of the individual components, ii) connectivity between respective individual components, and iii) the first AM machine, wherein the executing of the forward search process includes:
    selecting a first component of the plurality of components based on calculated parameters associated with producing the individual components of the plurality of components by the first AM machine; and
    iteratively adding another component of the plurality of components thereto to generate first combinations until an entirety of the assembly is accounted for, the adding of the other components based on calculated parameters associated with producing the first combinations by the first AM machine;
  executing, by the processor, the reverse search process to evaluate second combinations of the plurality of components, wherein the executing of the reverse search process includes:
    identifying the entirety of the assembly generated by the forward search process; and
    iteratively removing ones of the plurality of components therefrom to generate the second combinations until a two-component set is reached, the removing of the ones of the plurality of components based on calculated parameters associated with producing the second combinations by the first AM machine;
  automatically selecting, by the processor, a combination of the plurality of components from the first and second combinations for consolidation, the selecting based on the calculated parameters;
  generating a three-dimensional model of the selected combination of the plurality of components for transmission to an AM controller that is to cause the first AM machine to produce the assembly; and
  iterating through the forward search process and the reverse search process for remaining components of the plurality of components not included in the selected combination.

2. The method of claim 1, wherein the indication of the assembly to produce by the first AM machine is received via a user interface.

3. The method of claim 1, wherein the indication of the assembly to produce by the first AM machine specifies a sub-assembly of another assembly.

4. The method of claim 1, wherein the plurality of components includes at least two different components.

5. The method of claim 1, wherein the first and second combinations are feasible combinations, and wherein the forward search process and the reverse search process include identifying, at each iterative step, combinations that are not feasible.

6. The method of claim 1, wherein the parameter is cost, the forward search process to start with a lowest cost component and in subsequent iterations add other components of the plurality of components having the lowest cost thereto in combinations.

7. The method of claim 1, wherein the parameter is cost, the reverse search process to start with the entirety of the assembly and iteratively remove components of the plurality of components having the lowest cost therefrom in combinations.

8. A system comprising:
  a memory storing processor-executable instructions; and
  a processor to execute the processor-executable instructions to cause the system to:
    receive an indication of an assembly to produce by a first additive manufacturing (AM) machine, the assembly including a plurality of components represented by respective component files;
    generate a first list and a second list based on the component files and the indication of the first AM machine, the first list to include pairs of components of the plurality of components that are in contact, the second list to include volumes of individual components of the plurality of components, the first list and second list to be inputs to a forward search process and a reverse search process;
    perform the forward search process to reduce an amount of feasible combinations of the plurality of components to evaluate for consolidation using a plurality of constraints including i) the respective volumes of the individual components, ii) connectivity between respective individual components, and iii) the first AM machine, the forward search process including:
      selecting a first component of the plurality of components based on calculated objective values associated with producing the individual components of the plurality of components by the first AM machine; and iteratively adding another component of the plurality of components thereto to generate first combinations until an entirety of the assembly is accounted for, the adding based on calculated objective values associated with producing the first combinations by the first AM machine;

perform the reverse search process to evaluate second combinations of the plurality of components, the reverse search process including:

identifying the entirety of the assembly as generated by the forward search process; and iteratively removing ones of the components of the plurality of components therefrom to generate the second combinations until a two-component set is reached, the removing the ones of the components in combinations therefrom based on calculated objective values associated with producing the second combinations by the first AM machine;

automatically select a combination of the plurality of components from the first and second combinations for consolidation, the selection based on the objective values;

generate a three-dimensional model of the selected combination of the plurality of components for transmission to an AM controller that is to cause the first AM machine to produce the assembly; and iterate through the forward search process and the reverse search process for remaining components of the plurality of components not included in the selected combination.

9. The system of claim 8, wherein the indication of the assembly to produce by the first AM machine is received via a user interface.

10. The system of claim 8, wherein the indication of the assembly to produce by the first AM machine specifies a sub-assembly of another assembly.

11. The system of claim 8, wherein the plurality of components includes at least two different components.

12. The system of claim 8, wherein the forward search process includes calculating the objective values associated with producing the individual components of the plurality of components and the first combinations thereof by the first AM machine.

13. The system of claim 8, wherein the object is cost, the processor is to perform the forward search process by selecting a lowest cost component and in subsequent iterations add other components of the plurality of components having the lowest cost thereto in combinations.

14. The system of claim 13, wherein the second combinations include ones of the first combinations, and wherein the reverse search process is performed after the forward search process, the processor is to perform the reverse search process by calculating the objective values associated with producing the second combinations, but for the costs previously calculated for the ones of the first combinations during the forward search process.

15. The system of claim 8, wherein the objective is cost, the processor is to perform the reverse search process by starting with the entirety of the assembly and iteratively remove components of the plurality of components having the lowest cost therefrom in combinations.

16. A computer-readable storage medium comprising machine-readable instructions to cause processor circuitry to at least:

receive an indication of an assembly to produce by a first additive manufacturing (AM) machine, the assembly including a plurality of components, each of the components of the plurality of components represented by a respective part file;

generate a first list and a second list based on the part files and the first AM machine, the first list to include pairs of components of the plurality of components that are in contact, the second list to include volumes and bounding box coordinates of individual components of the plurality of components, the first list and second list to be inputs to a forward search process and a reverse search process;

perform the forward search process to reduce an amount of possible combinations of the plurality of components to evaluate for consolidation using a plurality of constraints including i) the respective volumes of the individual components, ii) connectivity between respective individual components, and iii) the first AM machine, wherein the forward search process includes:

selecting a first one of the individual components of the plurality of components based on calculated metrics associated with producing the individual components of the plurality of components; and iteratively adding another component of the plurality of components thereto to generate first combinations until an entirety of the assembly is accounted for, the adding based on calculated metrics associated with manufacturing the first combinations by the first AM machine;

perform the reverse search process to evaluate second combinations of the plurality of components by wherein the forward search process includes:

obtaining the entirety of the assembly that was generated by the forward search process; and iteratively removing components therefrom to generate the second combinations until a two-component set is reached, the removing based on respective calculated metrics associated with producing the second combinations by the first AM machine;

automatically select a combination of the plurality of components from the first and second combinations for consolidation based on the metrics;

generate a three-dimensional model of the selected combination of the plurality of components for transmission to an AM controller that is to cause the first AM machine to produce the assembly; and iterate through the forward search process and the reverse search process for remaining components of the plurality of components not included in the selected combination.

17. The medium of claim 16, wherein the metrics include costs, the forward search process to start with a lowest cost component and in subsequent iterations add other components of the plurality of components having the lowest cost thereto in combinations.

18. The medium of claim 16, wherein the second combinations include ones of the first combinations, and wherein the reverse search process is performed after the forward search process, the reverse search process to include calculating the metrics associated with the second combinations, except for respective metrics previously calculated for the ones of the first combinations by the forward search process.

19. The method of claim 5, wherein the forward search process includes calculating the parameters associated with the individual components of the plurality of components and the first combinations based on the part files and the first AM machine, except for the combinations that are not feasible.

20. The method of claim 1, wherein the second combinations include ones of the first combinations, and wherein the reverse search process is performed after the forward search process, the reverse search process including calculating the cost parameters associated with the second combinations excluding (a) respective costs parameters associated with the ones of the first combinations and (b) the combinations that are not feasible.

* * * * *